United States Patent
Kawauchi et al.

(10) Patent No.: US 12,287,257 B2
(45) Date of Patent: Apr. 29, 2025

(54) LOAD ESTIMATION APPARATUS, LOAD ESTIMATION METHOD, AND PROGRAM

(71) Applicant: MITSUBISHI HEAVY INDUSTRIES, LTD., Tokyo (JP)

(72) Inventors: Akihisa Kawauchi, Tokyo (JP); Hiroyuki Kono, Tokyo (JP); Koji Uchida, Tokyo (JP); Teruo Yamashita, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 466 days.

(21) Appl. No.: 17/268,696

(22) PCT Filed: Sep. 5, 2019

(86) PCT No.: PCT/JP2019/035023
§ 371 (c)(1),
(2) Date: Feb. 16, 2021

(87) PCT Pub. No.: WO2020/054579
PCT Pub. Date: Mar. 19, 2020

(65) Prior Publication Data
US 2021/0231533 A1 Jul. 29, 2021

(30) Foreign Application Priority Data
Sep. 14, 2018 (JP) .................. 2018-172504

(51) Int. Cl.
*G01M 17/10* (2006.01)
*B61F 99/00* (2006.01)
(Continued)

(52) U.S. Cl.
CPC ............. *G01M 17/10* (2013.01); *B61F 99/00* (2013.01); *B61K 9/02* (2013.01); *B61L 25/021* (2013.01); *G01G 19/08* (2013.01); *G01P 15/00* (2013.01)

(58) Field of Classification Search
CPC ........... G01M 17/10; B61F 99/00; B61F 5/24; B61K 9/02; B61K 13/00; B61L 25/021;
(Continued)

(56) References Cited

U.S. PATENT DOCUMENTS 4,128,011 A * 12/1978 Savage .................... E02D 1/02
73/632
2003/0028358 A1* 2/2003 Niu ........................ G01B 11/24
703/2

FOREIGN PATENT DOCUMENTS

| AU | 2006/251855 | * 11/2006 | ............. G06F 19/00 |
| JP | H07-333098 A | 12/1995 | |

(Continued)

OTHER PUBLICATIONS

Davood Younesian et al., "Fatigue life estimation of MD36 and MD523 bogies based on damage accumulation and random fatigue theory", Journal of Mechanical Science and Technology 23 (2009), pp. 2149-2156.*

(Continued)

*Primary Examiner* — Alexander Satanovsky
(74) *Attorney, Agent, or Firm* — HAUPTMAN HAM, LLP

(57) ABSTRACT

A load estimation apparatus includes: an acceleration sensor attached to at least one of a bogie body supporting wheels or a vehicle body attached to the bogie body and configured to measure a first acceleration; and a control unit configured to estimate a load which is applied to the bogie body on the basis of load information which is acquired in advance and (Continued)

in which an acceleration and a load are correlated and the first acceleration.

9 Claims, 11 Drawing Sheets

(51) Int. Cl.
*B61K 9/02* (2006.01)
*B61L 25/02* (2006.01)
*G01G 19/08* (2006.01)
*G01P 15/00* (2006.01)

(58) Field of Classification Search
CPC ..... B61L 15/0081; G01G 19/08; G01P 15/00; G01H 17/00; G01L 1/005
See application file for complete search history.

(56) References Cited

FOREIGN PATENT DOCUMENTS

| JP | 09243518 | * | 9/1997 | ............ G01M 13/00 |
| JP | H09-243518 A | | 9/1997 | |
| JP | 2009156650 | * | 7/2009 | .............. G01M 7/00 |
| JP | 2010-286459 A | | 12/2010 | |
| JP | 2014-163047 A | | 9/2014 | |
| JP | 2015-042106 A | | 3/2015 | |
| JP | 5691319 B2 | | 4/2015 | |

OTHER PUBLICATIONS

Zili Li et al., "Improvements in Axle Box Acceleration Measurements for the Detection of Light Squats in Railway Infrastructure", IEEE Transactions On Industrial Electronics, vol. 62, No. 7, Jul. 2015, pp. 4385-4397.*

Ohann Wannenburg, "A Study of Fatigue Loading On Automotive and Transport Structures", A thesis submitted for the degree of PhD (Mechanical Engineering) in the Faculty of Engineering, the Built Environment and Information Technology of the University of Pretoria, Aug. 2007, 183 pages.*

PCT/ISA/210, "International Search Report for International Application No. PCT/JP2019/035023," Nov. 19, 2019.

PCT/ISA/237, "Written Opinion of the International Searching Authority for International Application No. PCT/JP2019/035023," Nov. 19, 2019.

T. Yagi et al., "Load Estimation Method of Truck Frame by Measuring Acceleration," RTRI Report, Mar. 2012, p. 29-34, vol. 26, No. 3.

* cited by examiner

| ACCELERATION MEASUREMENT POINT | FREQUENCY BAND | ACCELERATION | LOAD |
|---|---|---|---|
| P4A | fA | a1 | FA1 |
| P4A | fA | a2 | FA2 |
| P4A | fA | a3 | FA3 |
| P4B | fB | b1 | FB4 |
| P4B | fB | b2 | FB5 |
| ... | ... | ... | ... |
| P4G | fG | g1 | FG1 |
| ... | ... | ... | ... |

631

LOAD ESTIMATION APPARATUS, LOAD ESTIMATION METHOD, AND PROGRAM

TECHNICAL FIELD

The present invention relates to a load estimation apparatus, a load estimation method, and a program.

Priority is claimed on Japanese Patent Application No. 2018-172504, filed Sep. 14, 2018, the content of which is incorporated herein by reference.

BACKGROUND ART

In vehicles of a new transportation system, when a bogie with tires attached thereto is damaged, a major accident may occur. Accordingly, it is necessary to monitor bogies and to determine lifespans thereof in order to predict when the bogies will be damaged, that is, the lifespans of the bogies. Patent Document 1 discloses a technique of calculating a time history response waveform of an acceleration signal in a suspension frame as a time history response waveform of a certain state quantity of a bogie of a vehicle in a guide-rail railroad using an acceleration sensor which is provided in the suspension frame of the bogie.

CITATION LIST

Patent Literature

[Patent Document 1]
Japanese Patent No. 5691319

SUMMARY OF INVENTION

Technical Problem

In the related art, a lifespan of a bogie is measured by measuring a load which is applied to the bogie using a strain gauge. However, when a load is monitored for a long time, time is required for maintenance of the strain gauge or the like, which makes operation difficult.

When a load is not estimated but a lifespan is measured using only an acceleration, it is difficult to set a threshold value for determining at what acceleration an abnormality occurs.

An objective of the invention is to provide a load estimation apparatus, a load estimation method, and a program that can measure a lifespan of a bogie using a simple method and estimate a load which is applied to the bogie using an acceleration to easily evaluate the soundness of a vehicle.

Solution to Problem

According to a first aspect of the invention, there is provided a load estimation apparatus including: an acceleration sensor attached to at least one of a bogie body supporting wheels or a vehicle body attached to the bogie body and configured to measure a first acceleration; and a control unit configured to estimate a load which is applied to the bogie body on the basis of load information which is acquired in advance and in which an acceleration and a load are correlated and the first acceleration.

According to a second aspect of the invention, a frequency of an acceleration which is determined on the basis of a change of the acceleration with time may be further correlated in the load information, and the control unit may further estimate the load which is applied to the bogie body on the basis of the load information and the first acceleration.

According to a third aspect of the invention, information corresponding to a position of the acceleration sensor may be further correlated in the load information, and the control unit may further estimate the load which is applied to the bogie body on the basis of the load information and the first acceleration.

According to a fourth aspect of the invention, a frequency of an acceleration which is determined on the basis of a change of the acceleration with time may be further correlated in the load information, and information corresponding to a position of the acceleration sensor may be further correlated in the load information. When the position of the acceleration sensor indicates a position on the bogie body, the frequency may be less than a natural frequency $f_{ch} \times \sqrt{2}$ where $f_{ch}$ is a value which is determined on the basis of a spring constant of an air suspension connecting the vehicle body and the bogie body and a vehicle body mass. When the position of the acceleration sensor indicates a position on the vehicle body, the frequency may be equal to or greater than $f_{ch} \times \sqrt{2}$.

According to a fifth aspect of the invention, a plurality of vehicle body masses may be further correlated in the load information, and the control unit may further acquire the vehicle body mass and further estimate the load which is applied to the bogie body on the basis of the load information, the first acceleration, and the vehicle body mass.

According to a sixth aspect of the invention, a plurality of positions at which a plurality of acceleration sensors are attached to at least one of the bogie body and the vehicle body may be further correlated in the load information, and the control unit may estimate the load which is applied to the bogie body on the basis of a plurality of accelerations which are measured by the plurality of acceleration sensors and the load information.

According to a seventh aspect of the invention, the load estimation apparatus may further include a warning device, and the control unit may determine whether a lifespan of the bogie body is over on the basis of a sum of a preset limit load and the load which is applied to the bogie body and transmit a signal for causing the warning device to generate a warning when it is determined that the lifespan of the bogie body is over.

According to an eighth aspect of the invention, the control unit of the load estimation apparatus may estimate the load on the basis of at least an acceleration sensor that is able to measure a lateral acceleration with respect to a longitudinal direction of the vehicle body when a load which is applied from a guide rail to the bogie body is estimated, and estimate the load on the basis of at least an acceleration sensor that is able to measure a vertical acceleration with respect to the longitudinal direction of the vehicle body when a load which is applied from a road to the bogie body is estimated.

According to a ninth aspect of the invention, the load estimation apparatus may further include a load detecting device that is further attached to at least one of the bogie body and the vehicle body, the load detecting device may include a load sensor that is configured to measure a second load which is applied to the bogie body and an acceleration sensor that is configured to measure a second acceleration, and the control unit may add the second load and the second acceleration to the load information.

According to a tenth aspect of the invention, the acceleration sensor of the load estimation apparatus may be attached to at least the vehicle body, the control unit may correct the first acceleration when a frequency which is acquired on the basis of a change with time of an acceleration acquired from the first acceleration is equal to or greater than $f_{ch} \times \sqrt{2}$ where a frequency for is a value which is determined on the basis of a spring constant of an air suspension connected between the bogie body and the vehicle body and a mass of the vehicle body, and the control unit may estimate the load which is applied to the bogie body on the basis of the corrected first acceleration.

According to an eleventh aspect of the invention, there is provided a load estimation method including: a step of measuring a first acceleration using an acceleration sensor attached to at least one of a bogie body supporting wheels or a vehicle body attached to the bogie body; and a step of estimating a load which is applied to the bogie body on the basis of load information which is acquired in advance and in which an acceleration and a load are correlated and the first acceleration.

According to a twelfth aspect of the invention, there is provided a program causing a computer of a load estimation apparatus to perform: a step of measuring a first acceleration using an acceleration sensor attached to at least one of a bogie body supporting wheels or a vehicle body attached to the bogie body; and a step of estimating a load which is applied to the bogie body on the basis of load information which is acquired in advance and in which an acceleration and a load are correlated and the first acceleration.

Advantageous Effects of Invention

According to any one of the aforementioned aspects, it is possible to estimate a load which is applied to a bogie using an acceleration sensor, to measure a lifespan of the bogie in a simple way, and to easily evaluate soundness of a vehicle.

DESCRIPTION OF EMBODIMENTS

First Embodiment

Hereinafter, a load estimation apparatus 10 according to a first embodiment will be described with reference to FIGS. 1 to 7.

(Overall Configuration)

Figure 1:
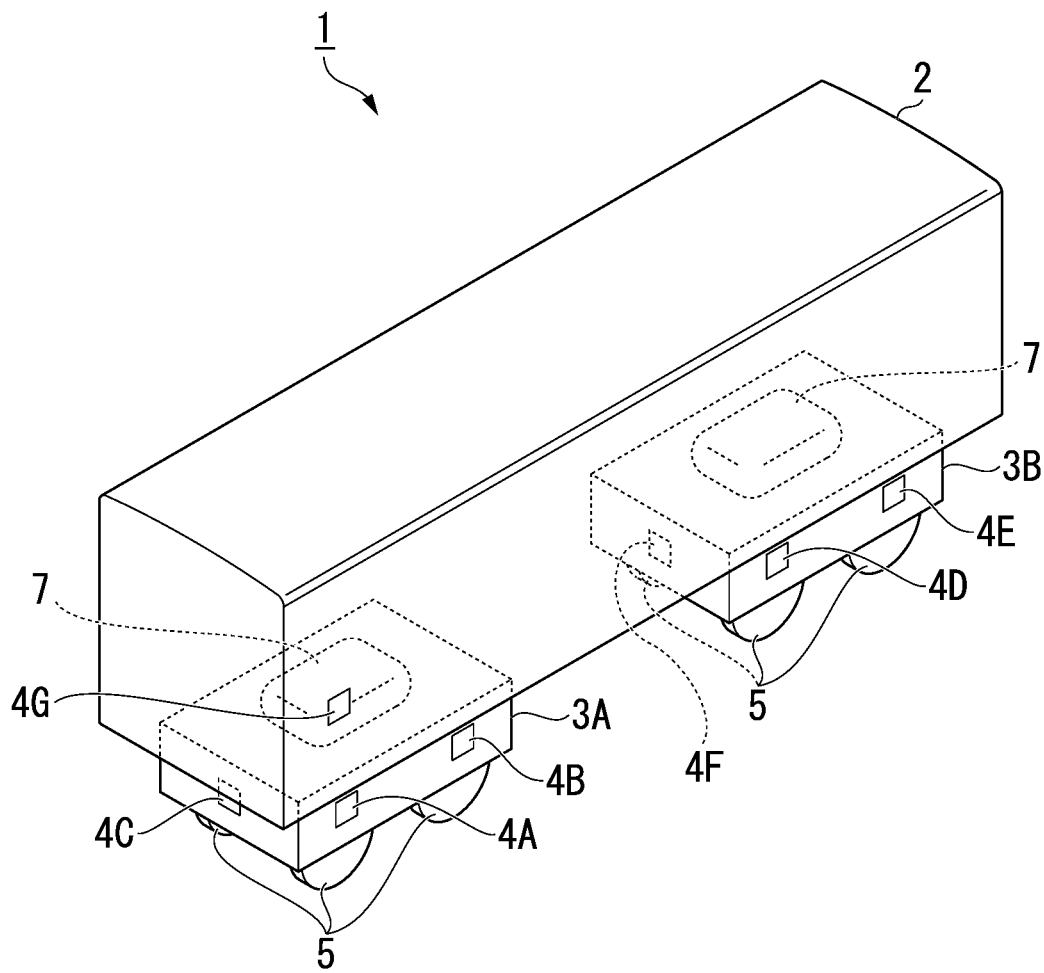
FIG. 1 is a diagram schematically illustrating a vehicle to which an acceleration sensor of a load estimation apparatus according to a first embodiment is attached.
Figure 1:
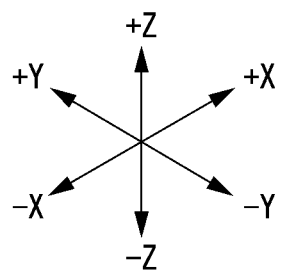

FIG. 1 is a diagram schematically illustrating a vehicle 1 to which acceleration sensors 4A to 4G of a load estimation apparatus 10 according to the first embodiment are attached.

Figure 2:
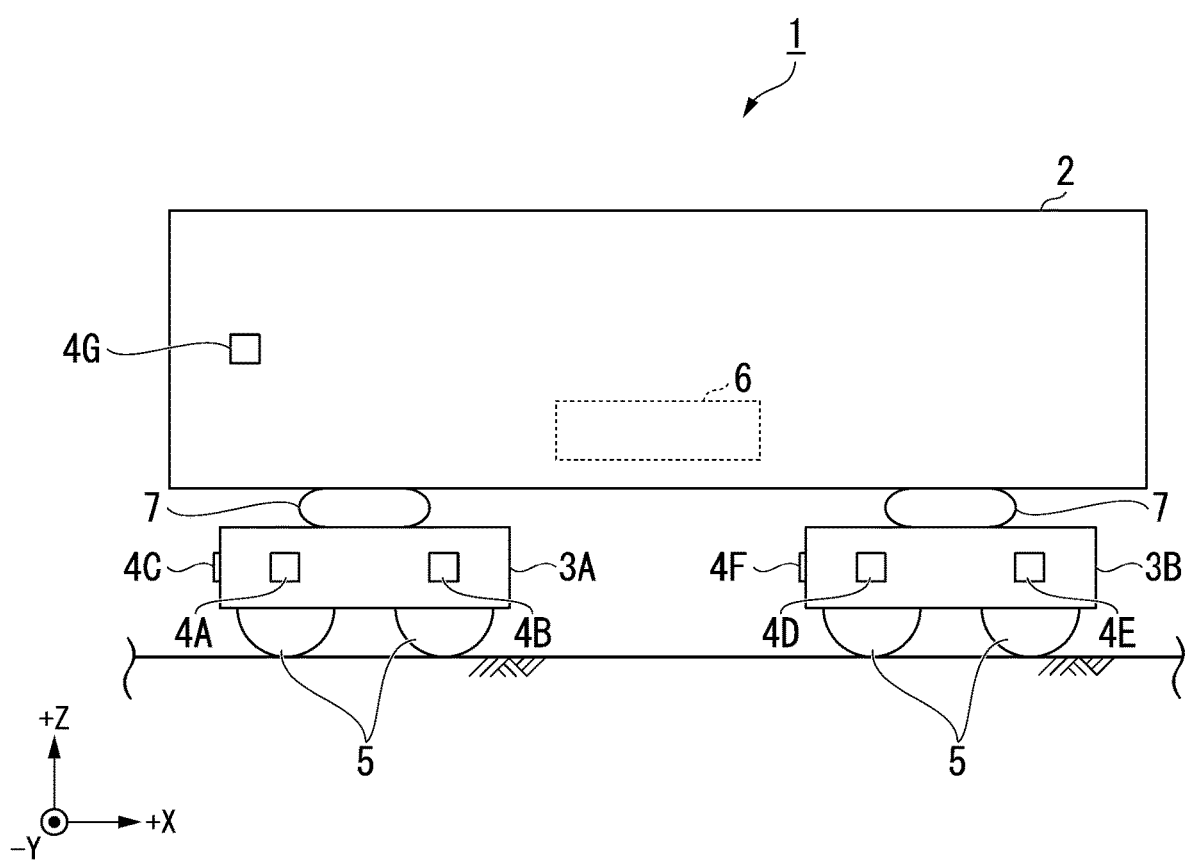
FIG. 2 is a side view of the vehicle to which the acceleration sensor of the load estimation apparatus according to the first embodiment is attached.

FIG. 2 is a side view of the vehicle I to which the acceleration sensors 4A to 4G of the load estimation apparatus 10 according to the first embodiment are attached. The vehicle 1 includes a vehicle body 2, bogies 3A and 3B, acceleration sensors 4A to 4G, wheels 5, a control device 6, and an air suspension 7. The vehicle body 2 may be a vehicle of a new transportation system or may be an automobile or a railroad vehicle. The vehicle body 2 and the bogie 3 are connected to each other with the air suspension 7 interposed therebetween. The air suspension 7 is to make vibration of the bogies 3A and 3B less being transmitted to the vehicle body 2, and something other than the air suspension may be used as long as it makes the vibration of the bogies 3A and 3B less being transmitted to the vehicle body 2. The bogies 3A and 3B and the wheels 5 may be connected to each other via wheel shafts. The wheels 5 may be tires formed of rubber or may be wheels formed of a metal for a railroad. The acceleration sensors 4A to 4F are attached to the bogies 3A and 3B by attachment members. The acceleration sensor 4G may be attached to the vehicle body 2 by an attachment member. The attachment member is, for example, a member that can attach an acceleration sensor to the vehicle body, such as an adhesive, a double-sided adhesive tape, a magnet, or a screw.

The acceleration sensors 4A to 4G measure accelerations at positions on the bogies 3A and 3B or on the vehicle body 2 to which the acceleration sensors 4A to 4G are attached. For example, the acceleration sensors 4A to 4G are assumed to be acceleration sensors that cannot measure an acceleration in a direction perpendicular to an attachment surface thereof. At this time, when it is intended to measure a longitudinal acceleration and a vertical acceleration with respect to the traveling direction of the vehicle 1, an acceleration sensor has only to be attached to a side surface of the bogies 3A and 3B or the vehicle body 2. When it is intended to measure a lateral acceleration and a vertical acceleration with respect to the traveling direction of the vehicle 1, an acceleration sensor has only to be attached to a front surface or a rear surface of the bogies 3A and 3B or the vehicle body 2. When the acceleration sensors 4A to 4G are sensors that can measure accelerations in all directions regardless of the attachment surface thereof, the acceleration sensors have only to be attached to any one of the side surfaces, the front surface, the rear surface, the top surface, and the bottom surface of the bogies 3A and 3B or the vehicle body 2.

Two of the acceleration sensors 4A to 4F are attached to the side surfaces of the bogies 3A and 3B and one is attached to the front surface thereof. The acceleration sensor 4G is attached to one side surface of the vehicle body 2. Here, the number of acceleration sensors is not limited thereto and, for example, only one acceleration sensor may be attached to the side surfaces of the bogies 3A and 3B or only one acceleration sensor may be attached to the rear surfaces of the bogies 3A and 3B. Alternatively, four acceleration sensors may be attached to each of two side surfaces of the bogies 3A and 3B and four acceleration sensors may be attached to each of the front surface and the rear surface of the bogies 3A and 3B, or an arbitrary number of acceleration sensors may be attached to arbitrary positions of the bogies 3A and 3B, for example, the side surfaces, the front surfaces, the rear surfaces, the top surfaces, the bottom surfaces, and the insides of the bogies 3A and 3B. Alternatively, an arbitrary number of acceleration sensors may be attached to arbitrary positions of the vehicle body 2, for example, the side surfaces, the front surface, the rear surface, the top surface, the bottom surface, and the inside of the vehicle body 2. Alternatively, an arbitrary number of acceleration sensors may be attached to arbitrary positions of at least one of the bogies 3A and 3B and the vehicle body 2, for example, the side surfaces, the front surfaces, the rear surfaces, the top surfaces, the bottom surfaces, and the insides of the bogies 3A and 3B and the vehicle body 2.

The control device 6 may be provided inside of the vehicle body 2, may be provided in a vehicle body other than the vehicle body 2, or may be provided in a system center or the like instead of the vehicle body 2 or the vehicle.

In the following description, the traveling direction of the vehicle 1 (the longitudinal direction of the vehicle body 2) is defined as a +X direction and the lateral direction with respect to the traveling direction is defined as a +Y direction. The vertical direction with respect to the traveling direction is defined as a +Z direction.

(Functional Configuration of Load Estimation Apparatus)

Figure 3:
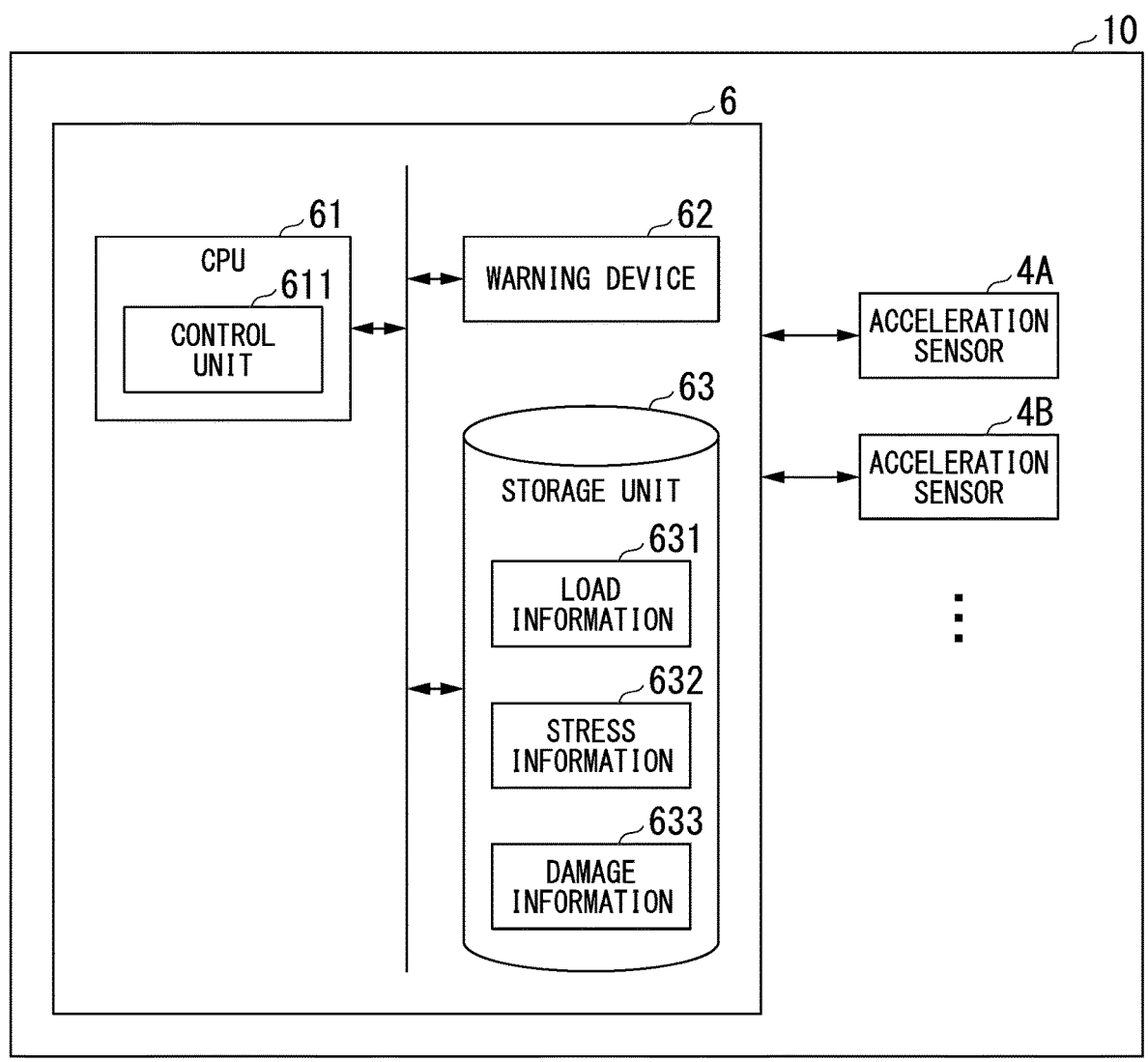
FIG. 3 is a diagram illustrating a functional configuration of the load estimation apparatus according to the first embodiment.

FIG. 3 is a diagram illustrating a functional configuration of the load estimation apparatus 10 according to the first embodiment.

As illustrated in FIG. 3, the load estimation apparatus 10 includes the control device 6 and the acceleration sensors 4A, 4B, . . . . The acceleration sensors 4A, 4B, . . . represent one or more acceleration sensors. In the following description, only the acceleration sensor 4A is used for description for the purpose of convenience, and the other acceleration sensors 4B, . . . have the same configuration.

The control device 6 includes a CPU 61, a warning device 62, and a storage unit 63.

The CPU 61 is a processor that performs various functions by operating in accordance with a prepared program and takes charge of all the operations of the load estimation apparatus 10. The CPU 61 serves as a control unit 611.

The acceleration sensor 4A measures an acceleration of an acceleration measurement point P4A which is a position of the bogie 3A to which the acceleration sensor 4A is attached. The acceleration sensor 4A transmits the measured acceleration a1 to the control unit 611.

The control unit 611 acquires the acceleration a1 measured by the acceleration sensor 4A. The control unit 611 acquires a frequency band fA corresponding to the acceleration measurement point P4A with reference to load information 631 which is stored in the storage unit 63. The control unit 611 measures a frequency which is determined on the basis of a change of the acquired acceleration with time. The control unit 611 determines whether the measured frequency is a frequency in the frequency band fA. When the measured frequency is a frequency in the frequency band fA, the control unit 611 acquires a load FA1 corresponding to the acceleration a1 with reference to the load information 631. At this time, the control unit 611 estimates a load F which is applied to the bogie 3A to be FA1.

Here, measuring of the frequency for the acceleration a1 by the control unit 611 may involve measuring a frequency on the basis of a change of an acceleration measured in a predetermined period immediately before and after the acceleration a1 is measured by the control unit 611. The control unit 611 may measure the frequency on the basis of a change of an acceleration measured in a predetermined period before the acceleration a1 is measured. The control unit 611 may measure the frequency on the basis of a change of an acceleration measured in a predetermined period after the acceleration a1 is measured. A minimum frequency in frequency bands fA, fB, . . . , fG stored in the load information 631 is defined as $f_{MIN}$. Here, the predetermined period before and after the acceleration is measured, the predetermined period before the acceleration is measured, or the predetermined period after the acceleration is measured may be a period which is equal to or greater than $1 \div f_{MIN}$ or may be set to an arbitrary period in which a frequency can be determined.

With reference to the stress information 632 of the storage unit 63, the control unit 611 estimates a stress σi at a desired position using the estimated load F and a coefficient k for estimating a stress at a position at which a stress is intended to be estimated on the basis of Expression 1.

(Stress σ*i* at desired position=estimated load *F*×coefficient *k* for estimating stress at desired position)     (Expression 1)

Here, stress information 632 is information in which the coefficient for estimating a stress at a position at which a stress is intended to be evaluated is correlated with information of the position at which a stress is intended to be evaluated on the bogie 3. The stress information 632 is prepared in advance by preliminary FEM analysis or the like.

The control unit 611 determines whether fatigue damage has occurred on the basis of the estimated stress σi with reference to damage information 633 in the storage unit 63. Here, the damage information 633 is information on an S—N curve which is calculated from the stress at the position at which a stress is intended to be evaluate and a repeat count up to the fatigue damage. The damage information 633 is prepared in advance by preliminarily performing fatigue evaluation.

Specifically, the control unit 611 determines whether fatigue damage has occurred using a cumulative fatigue damage rule. In the cumulative fatigue damage rule, whether fatigue damage has occurred is determined by considering a state in which various types of stresses occur randomly as a sum of states in which different stresses such as σ1, σ2, . . . , and σi are independently repeated. For example, it is assumed that the stresses σ1, σ2, . . . , and σi are applied to a fatigue damage evaluation object by preliminary stress waveform analysis. At this time, the repeat count up to breakage is read from the S—N curve and is defined as N1, N2, . . . , and Ni. Here, when it is assumed that the stresses σ1, σ2, . . . , and σi are repeatedly applied n1, n2, . . . , and ni times respectively, degrees of damage thereof can be expressed by n1/N1, n2/N2, . . . , and ni/Ni. When the sum of the degrees of damage is defined as a total degree of damage D, D is expressed by the following expression.

$$D = n1/N1 + n2/N2 + \ldots + ni/Ni = \Sigma ni/Ni \quad \text{(Expression 2)}$$

When D<1 is satisfied, the control unit 611 determines that fatigue damage is not to occur and the control unit 611 performs measurement of an acceleration again. When D≥1 is satisfied, the control unit 611 determines that fatigue damage is to occur, determines that the lifespan of the bogie 3 is over, and transmits a signal for providing a warning to the warning device 62.

When the signal is received from the control unit 611, the warning device 62 generates a warning to inform that fatigue damage has occurred.

The storage unit 63 stores the load information 631, the stress information 632. and the damage information 633.

The load information 631 is referred to when the control unit 611 estimates a load from the accelerations acquired from the acceleration sensors 4.

The stress information 632 is referred to when the control unit 611 estimates a stress at a desired position from the estimated load.

The damage information 633 is referred to when the control unit 611 predicts a lifespan from the estimated stress.

The storage unit 63 is a large-capacity storage device (a nonvolatile memory) which is incorporated in the load estimation apparatus 10 and examples thereof include a hard disk drive (HDD) and a solid state drive (SSD). The storage unit 63 is also called an auxiliary storage device and stores acquired information.

Estimation of a load applied to the bogie 3A has been described above using the acceleration sensor 4A, but the acceleration sensor 4B, 4C, or 4G may be used. The acceleration sensors 4D to 4G may be used to estimate a load applied to the bogie 3B.

(Estimation of Load from Acceleration)

A relationship between an acceleration and a load will be described below.

Figure 4:
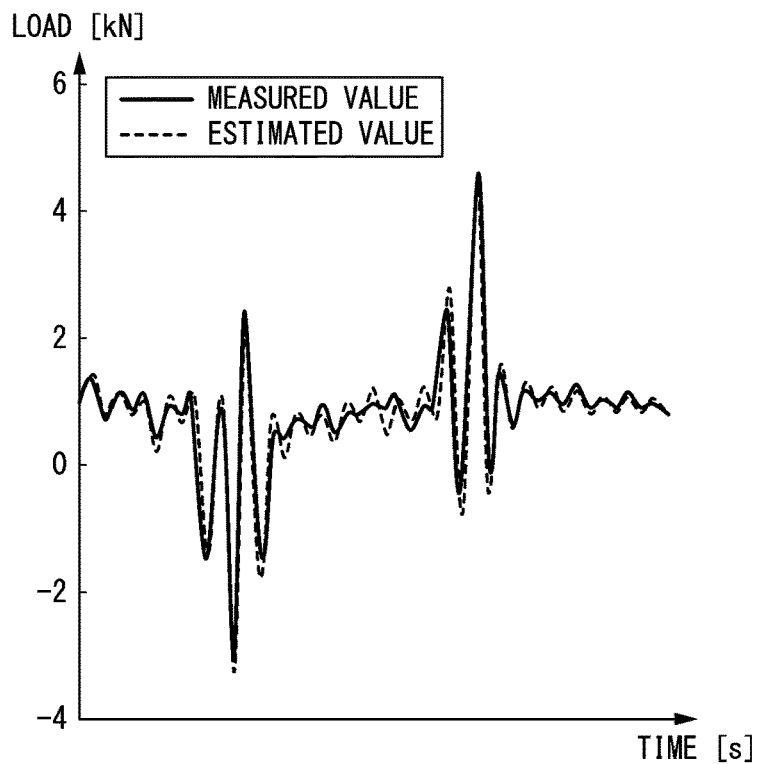
FIG. 4 is a diagram illustrating a relationship between an estimated value and a measured value of a load according to the first embodiment.

FIG. 4 is a diagram illustrating a relationship between an estimated value and a measured value of a load in the first embodiment.

The horizontal axis in FIG. 4 represents the time [s] and the vertical axis represents the load [kN]. A solid line indicates a measured value of a load which is measured by a load sensor at an arbitrary position of the bogie. A dotted line indicates an estimated value of the load which is calculated by multiplying the value of the acceleration measured at an arbitrary position on the bogie or the vehicle body by the acceleration sensor by a value of a mass of the bogie. As illustrated in FIG. 4, the measured value of the load measured by the load sensor and the estimated value of the load calculated from the value of the acceleration measured by the acceleration sensor are correlated with each other. Accordingly, it is possible to estimate the value of a load which is applied to the bogie from the value of the acceleration.

(Relationship Between Acceleration Evaluation Point and Frequency)

A relationship between an acceleration evaluation point and a frequency will be described below.

Figure 5:
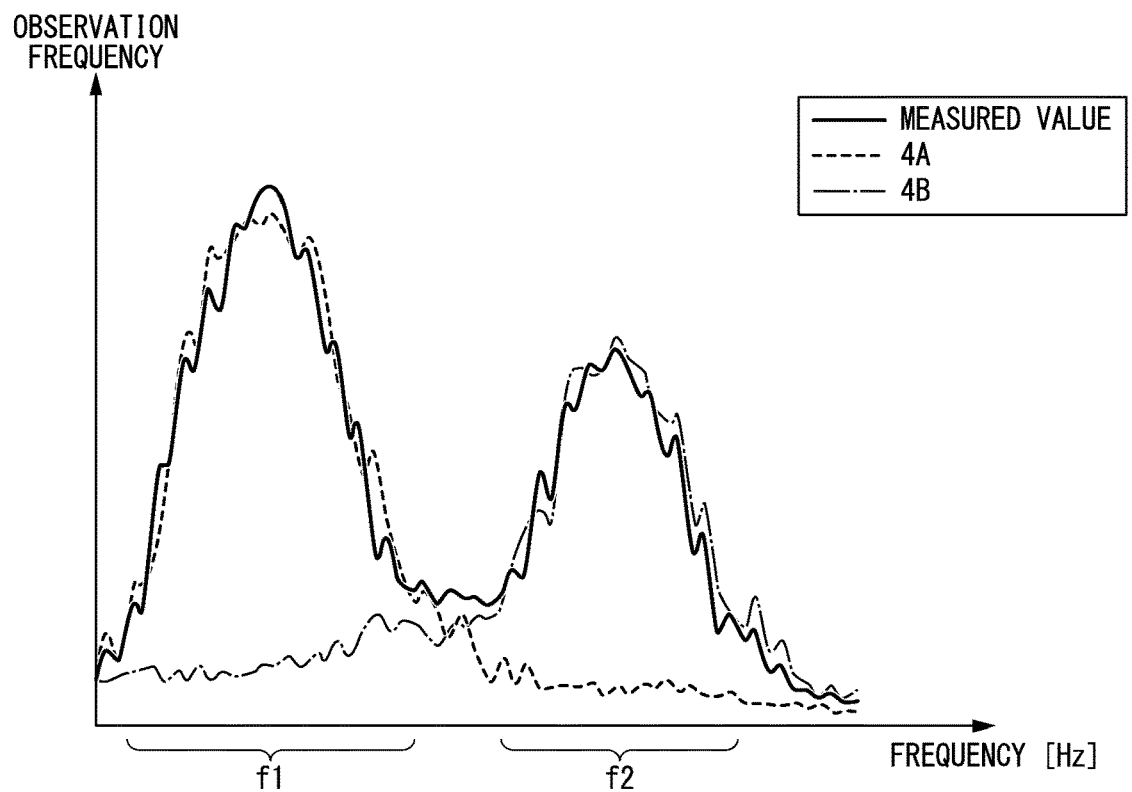
FIG. 5 is a diagram illustrating a relationship between a frequency and an observation frequency according to the first embodiment.

FIG. 5 is a diagram illustrating a relationship between a frequency and an observation frequency in the first embodiment.

The horizontal axis in FIG. 5 represents a frequency [Hz] of a load, and the vertical axis represents an observation frequency. The observation frequency indicates an observation frequency of a specific frequency occupying the total number of observations. A frequency of a load, a frequency of an estimated value of the load estimated from an acceleration measured by the acceleration sensor 4A, and a frequency of an estimated value of the load estimated from the acceleration measured by the acceleration sensor 4B are based on shaking of the bogie 3A. For example, when the bogie travels on a smooth concrete surface, the shaking of the bogie 3A decreases and thus the value of the frequency is great. On the other hand, when the bogie travels on a road with obstacles such as gravel or a road with cracks or a step difference, the shaking of the bogie 3A does not decrease and thus the value of the frequency is small. The value of the frequency can change depending on the weight of the vehicle body 2 when the vehicle body 2 is empty, when a fixed number of passengers are in the vehicle body 2, or when the vehicle body 2 is full.

A solid line in FIG. 5 indicates a frequency distribution of the measured value of the load measured by the load sensor at an arbitrary acceleration evaluation point on the bogie 3A. A dotted line indicates a frequency distribution of the estimated value of the load which is calculated by multiplying the value of the acceleration measured at an acceleration evaluation point to which the acceleration sensor 4A is attached by the acceleration sensor 4A by the value of the mass of the bogie 3A. A dashed-dotted line indicates a frequency distribution of the estimated value of the load calculated by multiplying the value of the acceleration measured at an acceleration evaluation point to which the acceleration sensor 4B is attached by the acceleration sensor 4B by the value of the mass of the bogie 3A.

As illustrated in FIG. 5, the frequency of the measured value of the load and the frequency of the estimated value of the load estimated from the acceleration measured by the acceleration sensor 4A are correlated in a frequency band fA. Accordingly, when the frequency of the acceleration measured by the acceleration sensor 4A is a frequency in the frequency band fA, the load may be estimated using the acceleration measured by the acceleration sensor 4A. Similarly, the frequency of the measured value of the load and the frequency of the estimated value of the load estimated from the acceleration measured by the acceleration sensor 4B are correlated in a frequency band fB. Accordingly, when the frequency of the acceleration measured by the acceleration sensor 4B is a frequency in the frequency band fB, the load may be estimated using the acceleration measured by the acceleration sensor 4B.

However, the frequency of the measured value of the load and the frequency of the estimated value of the load estimated from the acceleration measured by the acceleration sensor 4A are not correlated outside the frequency band fA. Accordingly, when the frequency of the acceleration measured by the acceleration sensor 4A is a frequency outside the frequency band fA, the acceleration measured by the acceleration sensor 4A is not used to estimate the load. Similarly, the frequency of the measured value of the load and the frequency of the estimated value of the load estimated from the acceleration measured by the acceleration sensor 4B are not correlated outside the frequency band fB. Accordingly, when the frequency of the acceleration measured by the acceleration sensor 4B is a frequency outside the frequency band fB, the acceleration measured by the acceleration sensor 4B is not used to estimate the load.

(Load Information)

The load information 631 stored in the storage unit 63 will be described below.

Figures 6, 7:
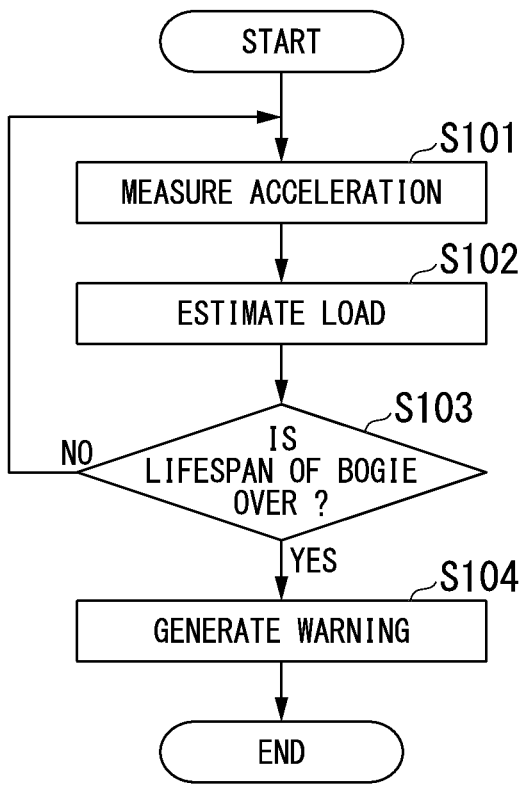
FIG. 6 is a diagram illustrating a data structure of load information according to the first embodiment.
FIG. 7 is a diagram illustrating a flow of a process performed by the load estimation apparatus according to the first embodiment.

FIG. 6 is a diagram illustrating a data structure of the load information 631 according to the first embodiment which is stored in the storage unit 63 as a database.

The load information 631 is information storing a relationship among an acceleration evaluation point, a frequency band, an acceleration and a load which are acquired by mechanism analysis or the like in advance. When this relationship is constructed, an acceleration is measured by an acceleration sensor attached to an acceleration evaluation point at which the acceleration sensor is able to practically measure an acceleration on at least one of the bogie and the vehicle body and a load is measured by a load sensor at an arbitrary point on the bogie 3. In this embodiment, for example, it is assumed that the acceleration and the load are measured at an acceleration evaluation point P4A to which the acceleration sensor 4A is attached in FIG. 2 in advance. Here, it is assumed that the frequency of the acceleration measured by the acceleration sensor 4A and the frequency of the load measured by the load sensor are correlated. At this time, the acceleration measurement point P4A at which the correlation is observed, the frequency band fA, accelerations a1 to a3 measured by the acceleration sensor 4A, and the loads FA1 to FA3 respectively corresponding to the accelerations a1 to a3 are stored in the load information 631. Similarly, it is assumed that the acceleration and the load are measured at an acceleration evaluation point P4B to which the acceleration sensor 4B is attached in FIG. 2 in advance. Here, it is assumed that the frequency of the acceleration measured by the acceleration sensor 4B and the frequency of the load measured by the load sensor are correlated. At this time, the acceleration measurement point P4B at which the correlation is observed, the frequency band fB, accelerations b1 and b2 measured by the acceleration sensors 4B, and the loads F4 and F5 respectively corresponding to the accelerations b1 and b2 are stored in the load information 631.

In the aforementioned example, with respect to the acceleration evaluation point P4A of the acceleration sensor 4A, the load information 631 includes data in which the frequency corresponds to a frequency in the frequency band fA, but does not include data in which the frequency corresponds to a frequency in the frequency band fB. Similarly, with respect to the acceleration evaluation point P4B of the acceleration sensor 4B, the load information 631 includes data in which the frequency corresponds to a frequency in the frequency band fB, but does not include data in which the frequency corresponds to a frequency in the frequency band fA.

The load information 631 may be constructed for each bogie of which a load is intended to be evaluated.

When a load applied to the bogie 3A is measured by the load sensor on the bogie 3A, it is thought that the same load is measured at an arbitrary position on the bogie 3A. Accordingly, the position of the load sensor at the time of constructing the load information 631 may be an arbitrary position on the bogie 3A.

The relationship between the load and the accelerations at a plurality of measurement points may be constructed by multiple regression analysis.

(Process Flow in Load Estimation Apparatus 10)

FIG. 7 is a diagram illustrating a flow of a process performed by the load estimation apparatus 10 according to the first embodiment. The following description will be made using only the acceleration sensor 4A for the purpose of convenience, but the other acceleration sensors 4B and the like have the same configuration.

The flow of the process illustrated in FIG. 7 is repeatedly performed while the vehicle 1 is traveling.

First, an acceleration a1 at a position to which the acceleration sensor 4A is attached on the bogie 3A is measured by the acceleration sensor 4A (Step S101). The acceleration sensor 4A transmits the measured acceleration a1 to the control unit 611. The control unit 611 acquires the acceleration a1 measured by the acceleration sensor 4A. The control unit 611 acquires a frequency band fA corresponding to the acceleration measurement point P4A with reference to the load information 631 stored in the storage unit 63. The control unit 611 measures a frequency which is determined by a change of the acquired acceleration a1 with time. The control unit 611 determines whether the measured frequency is a frequency in the frequency band fA. When the measured frequency is a frequency in the frequency band fA, the control unit 611 acquires a load FA1 corresponding to the acceleration a1 with reference to the load information 631. At this time, the control unit 611 estimates the load F applied to the bogie 3A to be FA1 (Step S102).

Here, measuring the frequency with respect to the acceleration a1 by the control unit 611 may be measuring a frequency on the basis of a change of an acceleration measured in a predetermined period before and after the acceleration a1 is measured by the control unit 611. The control unit 611 may measure the frequency on the basis of a change of an acceleration measured in a predetermined period before the acceleration a1 is measured. The control unit 611 may measure the frequency on the basis of a change of an acceleration measured in a predetermined period after the acceleration a1 is measured. A minimum frequency in frequency bands fA, fB, . . . , fG stored in the load information 631 is defined as $f_{MIN}$. Here, the predetermined period before and after the acceleration is measured, the predetermined period before the acceleration is measured, or the predetermined period after the acceleration is measured may be a period which is equal to or greater than $1 \div f_{MIN}$ or may be set to an arbitrary period in which a frequency can be determined.

When a plurality of loads are simultaneously measured through measurement of an acceleration by a plurality of acceleration sensors, an average value of the plurality of loads may be determined as the load F. Alternatively, when a plurality of loads are simultaneously measured through measurement of an acceleration by a plurality of acceleration sensors, the load F may be estimated by multiple regression analysis.

Then, the control unit 611 determines whether a lifespan of the bogie 3 is over (Step S103). That is, the control unit 611 estimates a stress $\sigma i$ at a desired evaluation position from the estimated load FA1 and a coefficient for estimating a stress at the desired evaluation position on the basis of the above-described Expression 1 with reference to the stress information 632 stored in the storage unit 63. The control unit 611 determines whether fatigue damage is to occur on the basis of the estimated stress $\sigma i$ with reference to the damage information 633 stored in the storage unit 63.

Specifically, the control unit 611 determines whether fatigue damage is to occur using a cumulative fatigue damage rule. In the cumulative fatigue damage rule, whether fatigue damage is to occur is determined by considering a state in which various types of stresses occur randomly as a sum of states in which different stresses such as $\sigma 1$, $\sigma 2$, . . . , $\sigma i$ are independently repeated. For example, it is assumed that the stresses $\sigma 1$, $\sigma 2$, . . . , $\sigma i$ are applied to a fatigue damage evaluation object by preliminary stress waveform analysis. At this time, the repeat count up to breakage is read from the S-N curve and is defined as N1, N2, ..., Ni. Here, when it is assumed that the stresses σ1, σ2, ..., and σi are repeatedly applied n1, n2, ..., ni times respectively, degrees of damages thereof can be expressed by n1/N1, n2/N2, ..., ni/Ni. When the sum of the degrees of damage is defined as D, D is expressed by the above-described Expression 2.

When D<1 is satisfied (Step S103: NO), the control unit 611 determines that fatigue damage is not to occur and the control unit 611 performs measurement of an acceleration again (Step S101). When D≥1 is satisfied (Step S103: YES), the control unit 611 determines that fatigue damage is to occur, determines that the lifespan of the bogie 3A is over, and transmits a signal for warning to the warning device 62. When the signal is received from the control unit 611, the warning device 62 performs warning (Step S104) to inform that the lifespan of the bogie 3A is over.

Process details from the process of causing the acceleration sensor to acquire an acceleration to the process of causing the load estimation apparatus 10 to inform the lifespan of the bogie 3 have been described above.

When a load which is applied from a guide rail to the bogie body is estimated, the control unit 611 may estimate the load on the basis of at least an acceleration sensor that is able to measure a lateral acceleration with respect to the longitudinal direction of the vehicle body. When a load which is applied from a road to the bogie body is estimated, the control unit 611 may estimate the load on the basis of at least an acceleration sensor that is able to measure a vertical acceleration with respect to the longitudinal direction of the vehicle body.

Further, the control unit 611 may compare the calculated load F and a preset design load and determine whether the lifespan of the bogie 3 is over only when the calculated load F is equal to or greater than the preset design load. It is necessary to ascertain in advance that there is no affection to the lifespan when the calculated load is less than the design load.

Estimation of a load applied to the bogie 3A has been described above, but a load applied to the bogie 3B may be estimated in the same way.

(Operations and Advantages)

The load estimation apparatus 10 according to the first embodiment includes the acceleration sensor 4A that measures a first acceleration and that is attached to at least one of the body of the bogie 3A supporting the wheels 5 and the vehicle body 2 attached to the body of the bogie 3A and the control unit 611 that estimates a load applied to the body of the bogie 3A on the basis of the load information 631 in which an acceleration and a load are correlated and which is acquired in advance and the first acceleration.

Accordingly, the load estimation apparatus 10 according to the first embodiment can estimate a load which is applied to the bogie 3A using the acceleration sensor 4A, measure the lifespan of the bogie 3A in a simple way, and easily evaluate soundness of the vehicle 1.

Modified Example of First Embodiment

While the load estimation apparatus 10 according to the first embodiment has been described above in detail, the specific configuration of the load estimation apparatus 10 is not limited to the above description and can be subjected to various modifications in design or the like without departing from the gist of the invention.

First Modified Example of First Embodiment

For example, in the load estimation apparatus 10 according to the first embodiment, the load information 631 illustrated in FIG. 6 is information storing a relationship among an acceleration evaluation point, a frequency band, an acceleration and a load which are acquired in advance by mechanism analysis is stored.

In a first modified example of the first embodiment, the load may be estimated from the acceleration in additional consideration of a change in vehicle body mass which changes depending on the number of passengers.

Specifically, in the first modified example of the first embodiment, the weight of the vehicle body 2 is changed at the time of a test of acquiring data, and the load information 631 for each weight of the vehicle body 2 is preliminarily constructed in advance. The control device 6 further includes a passenger mass measuring device that measures the weight of the vehicle body 2.

The control unit 611 acquires a passenger mass measured by the passenger mass measuring device. The control unit 611 acquires load information 631' corresponding to the acquired passenger mass from the storage unit 63. The control unit 611 acquires an acceleration a1 measured by the acceleration sensor 4A. The control unit 611 acquires a frequency band fA corresponding to the acceleration measurement point P4A with reference to the load information 631' stored in the storage unit 63. The control unit 611 measures a frequency which is determined depending on a change of the acquired acceleration a1 with time. The control unit 611 determines whether the measured frequency is a frequency in the frequency band fA. When the measured frequency is a frequency in the frequency band fA, the control unit 611 acquires a load FA1 corresponding to the acceleration a1 with reference to the load information 631'. At this time, the control unit 611 estimates the load F applied to the bogie 3A to be FA1.

Accordingly, it is possible to improve load estimation accuracy by switching a load estimation logic which is used depending on the passenger mass.

Second Modified Example of First Embodiment

For example, in the load estimation apparatus 10 according to the first embodiment, the load information 631 illustrated in FIG. 6 is information storing a relationship among an acceleration evaluation point, a frequency band, an acceleration and a load which are acquired in advance by mechanism analysis or the like are stored.

In a second modified example of the first embodiment, frequency bands fA to fF corresponding to the acceleration measurement points P4A to P4F on the bogie 3 in the load information 631 may be fA, ..., fF≥$f_{ch} \times \sqrt{2}$ where $f_{ch}$ is a natural frequency which is determined on the basis of a spring constant of an air suspension and a vehicle body mass. The frequency band fG corresponding to the acceleration evaluation point P4G on the vehicle body 2 in the load information 631 may satisfy fG<$f_{ch} \times \sqrt{2}$.

A frequency equal to or greater than $f_{ch} \times \sqrt{2}$ is a frequency based on shaking which is caused by small unevenness of a road, a guide rail, or the like. Since the amplitude with a frequency equal to or greater than $f_{ch} \times \sqrt{2}$ is attenuated by the air suspension, it may be difficult to measure the acceleration of such a frequency using an acceleration sensor on the vehicle body 2.

A frequency less than $f_{ch} \times \sqrt{2}$ is a frequency based on shaking which is caused by large unevenness of a road or a centrifugal force when the vehicle 1 turns. Since the amplitude with a frequency less than $f_{ch} \times \sqrt{2}$ is less attenuated by the air suspension, the acceleration of such a frequency can be measured using an acceleration sensor on the vehicle body 2.

Accordingly, since frequencies in the load information 631 are classified into frequencies which can be measured on the vehicle body 2 and frequencies which can be measured on the bogie 3, it is possible to improve reliability of the load information 631 and to improve load estimation accuracy.

As described above, information included in the load information 631 is classified depending on the magnitude of the natural frequency $f_{ch}$. Here, the magnitude of the natural frequency $f_{ch}$ may be adjusted at the time of constructing the load information 631.

Second Embodiment

Hereinafter, a load estimation apparatus 10 according to a second embodiment will be described with reference to FIGS. 8 to 10.
(Overall Configuration)

Figure 8:
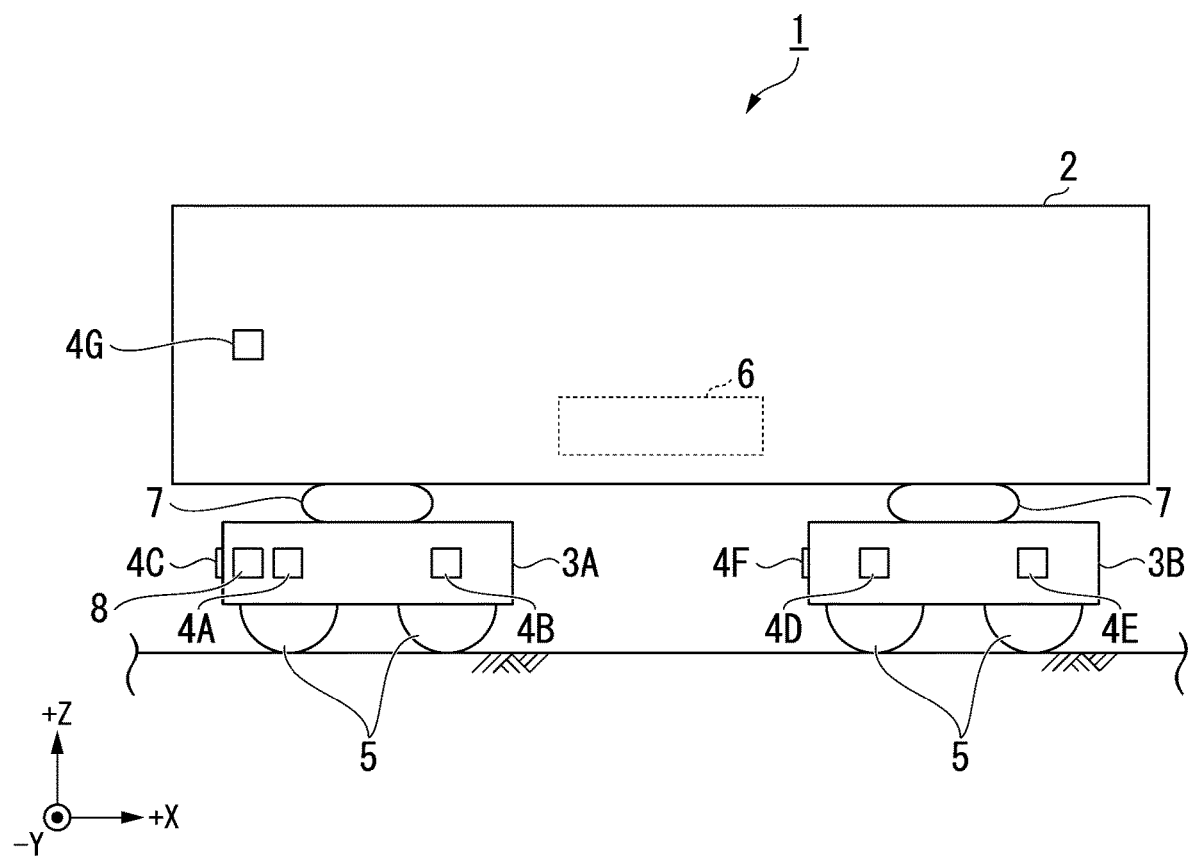
FIG. 8 is a side view of a vehicle to which an acceleration sensor of a load estimation apparatus according to a second embodiment is attached.

FIG. 8 is a diagram schematically illustrating a vehicle to which acceleration sensors 4A to 4G of the load estimation apparatus 10 according to the second embodiment are attached.

As illustrated in FIG. 8, in the load estimation apparatus 10 according to the second embodiment, a load detecting device 8 is attached to one side surface of the bogie 3A in addition to the configuration according to the first embodiment. The position to which the load detecting device 8 is attached is not limited to the side surface of the bogie 3A as illustrated in FIG. 8, but may be an arbitrary position of the bogies 3A and 3B or the vehicle body 2.
(Functional Configuration of Load Estimation Apparatus)

Figure 9:
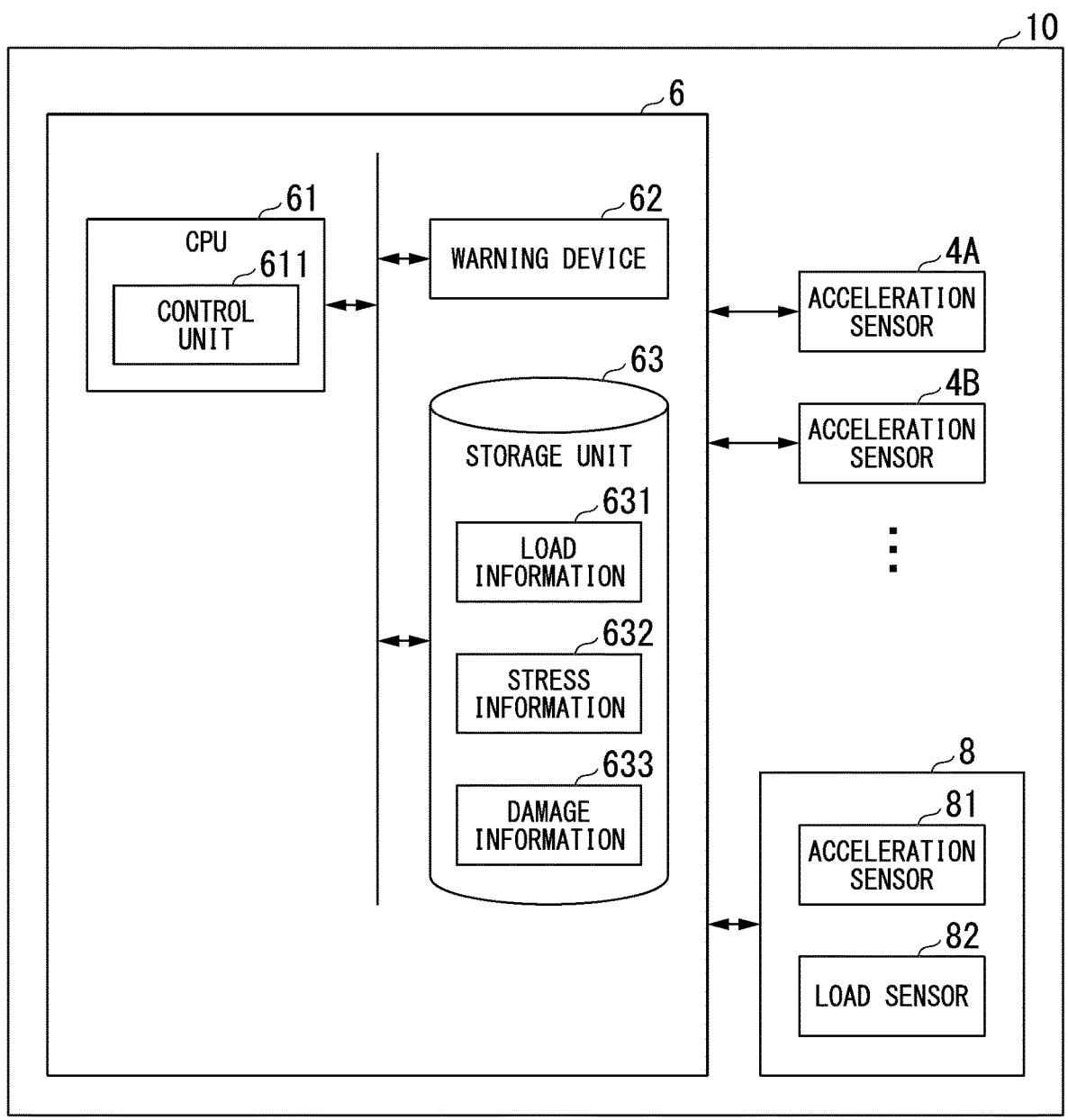
FIG. 9 is a diagram illustrating a functional configuration of the load estimation apparatus according to the second embodiment.

FIG. 9 is a diagram illustrating a functional configuration of the load estimation apparatus 10 according to the second embodiment.

As illustrated in FIG. 9, the load estimation apparatus 10 according to the second embodiment includes the load detecting device 8 in addition to the configuration according to the first embodiment. Accordingly, the elements other than the load detecting device 8 in the load estimation apparatus 10 according to the second embodiment are configured and function in the same way as the elements of the load estimation apparatus 10 according to the first embodiment unless otherwise mentioned.

The load detecting device 8 includes an acceleration sensor 81 and a load sensor 82. The acceleration sensor 81 has the same function as the acceleration sensors 4A to 4G in the first embodiment. The acceleration sensor 81 measures an acceleration c1 of the bogie 3A which is traveling and transmits a signal indicating the acceleration c1 to the control unit 611. The load sensor 82 measures a load F8 applied to the bogie 3A at the same time as the acceleration sensor 81 measures the acceleration, and transmits a signal indicating the load F8 to the control unit 611.

In the load information 631, a frequency band f8 in which an acceleration and a load are correlated with respect to an acceleration measurement point P8 of the load detecting device 8 is stored by mechanism analysis or the like in advance.

The control unit 611 acquires the frequency band f8 corresponding to the acceleration measurement point P8 with reference to the load information 631. The control unit 611 measures the frequency of the measured acceleration c1. The control unit 611 determines whether the measured frequency is a frequency in the frequency band f8. When the measured frequency is a frequency in the frequency band f8, the control unit 611 adds the measured acceleration c1 and the load F8 to the load information 631.
(Process Flow in Load Estimation Apparatus 10)

Figure 10:
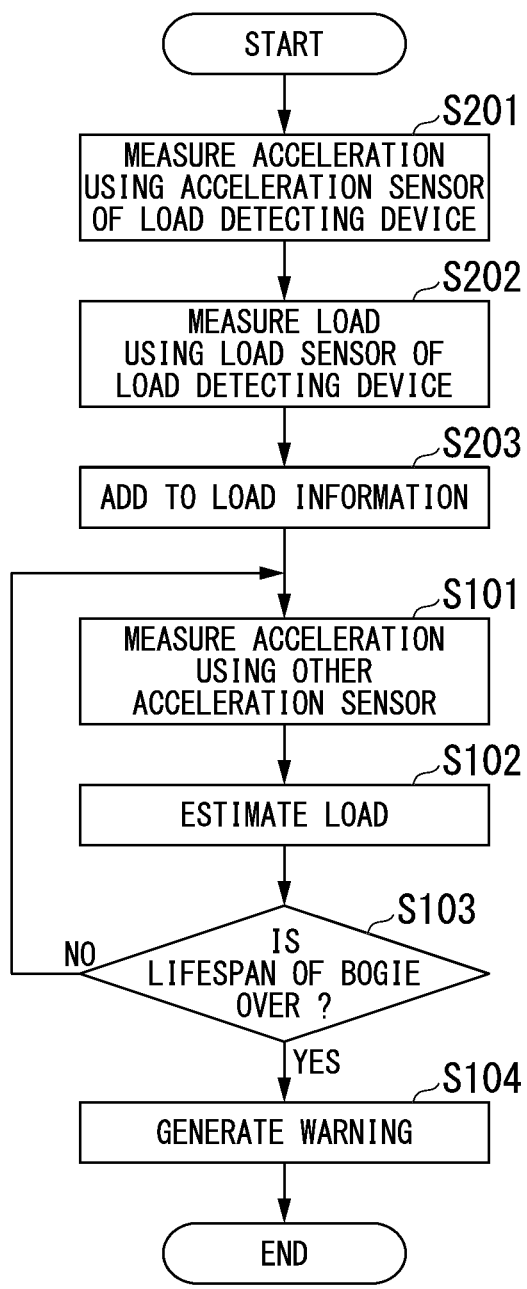
FIG. 10 is a diagram illustrating a flow of a process performed by the load estimation apparatus according to the second embodiment.

FIG. 10 is a diagram illustrating a flow of a process performed by the load estimation apparatus 10 according to the second embodiment.

The flow of a process in the load estimation apparatus 10 according to the second embodiment illustrated in FIG. 10 is different from the flow of a process in the load estimation apparatus 10 according to the first embodiment illustrated in FIG. 7 in that Steps S201 to S203 are added. The processes other than Steps S201 to S203 in the load estimation apparatus 10 according to the second embodiment are the same as the processes in the load estimation apparatus 10 according to the first embodiment and thus differences therebetween will be described below.

First, the acceleration sensor 81 of the load detecting device 8 measures the acceleration c1 of the bogie 3A which is traveling (Step S201), and transmits a signal indicating the acceleration c1 to the control unit 611. At the same time, the load sensor 82 of the load detecting device 8 measures the load F8 applied to the bogie 3A (Step S202) and transmits a signal indicating the load F8 to the control unit 611. The control unit 611 acquires the frequency band f8 corresponding to the acceleration measurement point P8 with reference to the load information 631. The control unit 611 measures the frequency of the measured acceleration c1. The control unit 611 determines whether the measured frequency is a frequency in the frequency band f8. When the measured frequency is a frequency in the frequency band f8, the control unit 611 adds the measured acceleration c1 and the load F8 to the load information 631 (Step S203).

Subsequent to Step S203, the processes of Steps S101 to S104 are performed for the acceleration sensor 4A similarly to the first embodiment, and the flow of a process illustrated in FIG. 10 ends.

As described above, information acquired by the load detecting device 8 is added to the load information 631 and then the load estimating process is performed using the acceleration sensor 4A. Here, when the vehicle 1 is traveling, information from the load detecting device 8 may be added to the load information 631 at any time.

Further, the control unit 611 may compare the calculated load F and a preset design load and determine whether the lifespan of the bogie 3 is over only when the calculated load F is equal to or greater than a preset design load. It is necessary to ascertain in advance that there is no affection to the lifespan when the calculated load is less than the design load.

Estimation of a load applied on the bogie 3A has been described above, but a load applied to the bogie 3B may be estimated in the same way.
(Operates and Advantages)

In the load estimation apparatus 10 according to the second embodiment, in addition to the load estimation apparatus 10 according to the first embodiment, the load detecting device 8 is further attached to at least one of the body of the bogie 3A or the vehicle body 2, the load detecting device 8 includes the load sensor 82 that measures a second load applied on the body of the bogie 3A and the acceleration sensor 81 that measures a second acceleration, and the control unit 611 adds the second load and the second acceleration to the load information 631.

Accordingly, since information on a vehicle which is actually traveling can be reflected in the load information 631, it is possible to improve load estimation accuracy.

Modified Example of Second Embodiment

While the load estimation apparatus 10 according to the second embodiment has been described above in detail, the specific configuration of the load estimation apparatus 10 is not limited to the above description and can be subjected to various modifications in design or the like without departing from the gist of the invention.

First Modified Example of Second Embodiment

For example, in the load estimation apparatus 10 according to the second embodiment, the load information 631 is information storing a relationship among an acceleration evaluation point, a frequency band, an acceleration and a load which are acquired in advance by mechanism analysis or the like are stored.

In a first modified example of the second embodiment, a small load which does not cause any problem in intensity may be excluded from the load information 631 in advance.

Specifically, in the first modified example of the second embodiment, it is assumed that the load measured by the load sensor 82 has a small value which does not affect damage of the bogie 3A when the load information 631 is constructed by mechanism analysis or the like in advance. At this time, the relationship among the acceleration evaluation point, the frequency band, the acceleration and the load are not stored in the load information 631.

With this configuration, since only data corresponding to a load which affects damage of the bogie 3A is used in the load information 631, it is possible to shorten a time required to construct useful load information 631.

Third Embodiment

Hereinafter, a load estimation apparatus 10 according to a third embodiment will be described with reference to FIGS. 11 to 14.
(Overall Configuration)

Figure 11:
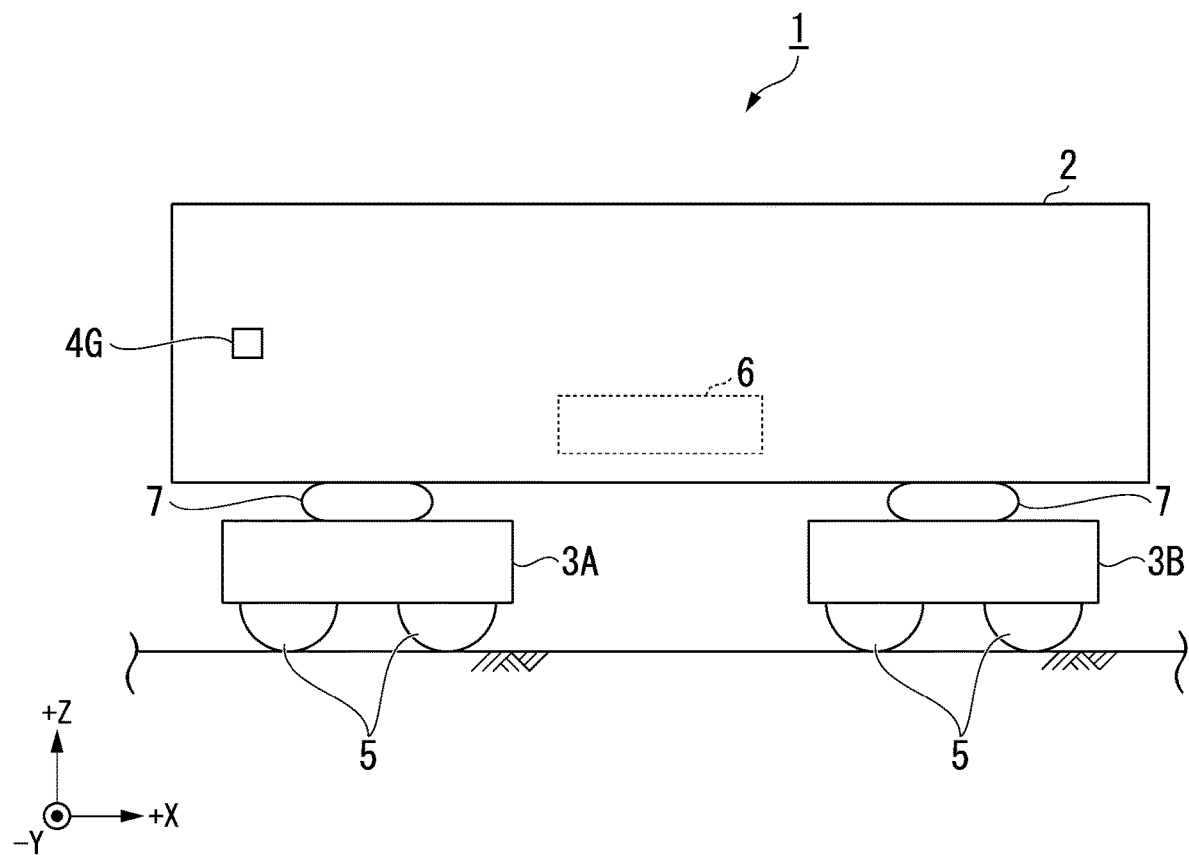
FIG. 11 is a side view of a vehicle to which an acceleration sensor of a load estimation apparatus according to a third embodiment is attached.

FIG. 11 is a side view of a vehicle to which an acceleration sensor 4G of the load estimation apparatus 10 according to the third embodiment is attached.

As illustrated in FIG. 11, in the load estimation apparatus 10 according to the third embodiment, no acceleration sensor is attached to the bogies 3A and 3B, and the acceleration sensor 4G is provided in only the vehicle body 2. The acceleration sensor 4G on the vehicle body 2 may be attached to the inside of the vehicle body 2 or may be attached to the outside of the vehicle body 2.
(Functional Configuration of Load Estimation Apparatus)

Figure 12:
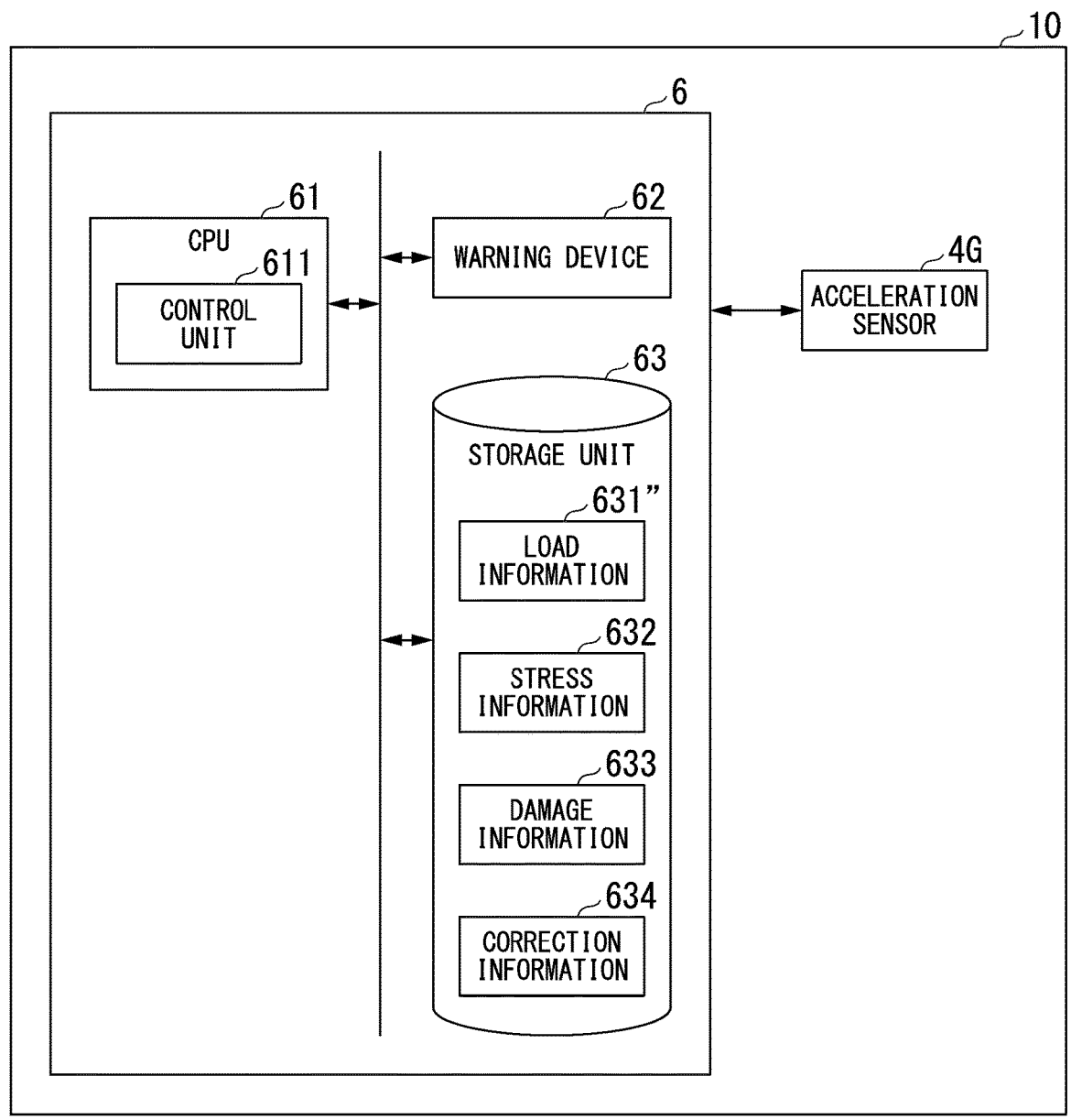
FIG. 12 is a diagram illustrating a functional configuration of the load estimation apparatus 10 according to the third embodiment.

FIG. 12 is a diagram illustrating a functional configuration of the load estimation apparatus 10 according to the third embodiment.

As illustrated in FIG. 12, the load estimation apparatus 10 according to the third embodiment includes correction information 634 in addition to the configuration according to the first embodiment. In the third embodiment, the storage unit 63 stores load information 631". The load estimation apparatus 10 according to the third embodiment includes only the acceleration sensor 4G. The acceleration sensor 4G in the third embodiment is configured and functions in the same way as the acceleration sensors 4A to 4F in the first or second embodiment. Further, the elements other than the load detecting device 8 in the load estimation apparatus 10 according to the third embodiment are configured and function in the same way as the elements of the load estimation apparatus 10 according to the first embodiment unless otherwise mentioned.

The acceleration sensor 4G measures an acceleration g1' at a position to which the acceleration sensor 4G is attached on the bogie 3A. In addition, the acceleration sensor 4G transmits the measured acceleration g1' to the control unit 611.

The control unit 611 acquires the acceleration g1' measured by the acceleration sensor 4G. The control unit 611 measures a frequency which is determined depending on a change of the acquired acceleration g1' with time. The control unit 611 determines whether the value of the measured frequency is equal to or greater than a natural frequency $f_{ch} \times \sqrt{2}$ which is determined from a spring constant of an air suspension and a vehicle body mass. When it is determined that the value of the measured frequency is equal to or greater than $f_{ch} \times \sqrt{2}$ (is fG1 or fG2), the control unit 611 determines in what frequency band the measured frequency is with reference to the correction information 634. Here, when the measured frequency is in the frequency band fG1, the control unit 611 acquires a correction coefficient α1 corresponding to the frequency band fG1 with reference to the correction information 634. The control unit 611 acquires the corrected acceleration g1 by multiplying the acceleration g1' by the acquired correction coefficient α1. The control unit 611 acquires a load FG1 corresponding to the acceleration g1 with reference to the load information 631". At this time, the control unit 611 estimates the load F applied to the bogie 3A to be FG1.

When the value of the measured frequency is less than $f_{ch} \times \sqrt{2}$ (is fG3), the control unit 611 does not correct the acquired acceleration g1' and sets the acceleration to g5=g1'. At this time, the control unit 611 does not refer to the correction information 634. Then, the control unit 611 acquires a load FG5 corresponding to the acceleration g5 with reference to the load information 631". At this time, the control unit 611 estimates the load F applied to the bogie 3A to be FG5.

As described above, the operation of the control unit 611 changes depending on the magnitude of the natural frequency $f_{ch}$. Here, the magnitude of the natural frequency $f_{ch}$ may be adjusted at the time of constructing the load information 631" and the correction information 634.
(Load Information and Correction Information)

The load information 631" and the correction information 634 stored in the storage unit 63 will be described below.

Figure 13:
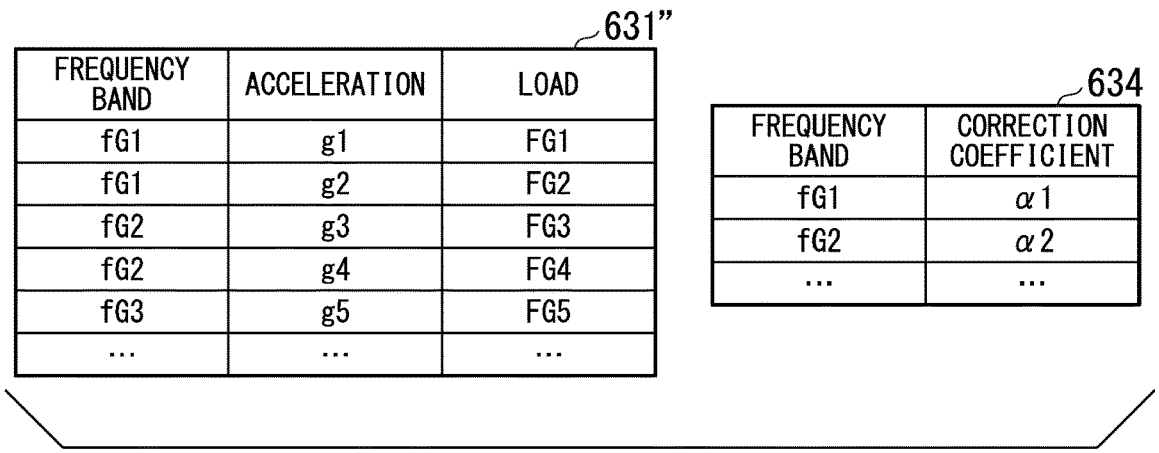
FIG. 13 is a diagram illustrating data structures of load information and correction information according to the third embodiment.

FIG. 13 is a diagram illustrating data structures of the load information 631" and the correction information 634 in the third embodiment stored in the storage unit 63 as a database.

The load information 631" is information storing a relationship among a frequency band, an acceleration and a load which are acquired in advance by mechanism analysis or the like are stored. When this relationship is constructed, an acceleration is measured by an acceleration sensor at an acceleration evaluation point at which the acceleration sensor is able to practically measure an acceleration on the vehicle body 2 and the bogie 3. A load is measured by a load sensor at the same position as the acceleration evaluation point on the bogie 3. In this embodiment, for example, it is assumed that an acceleration at an acceleration evaluation point P4G on the vehicle body 2 to which the acceleration sensor 4G is attached as illustrated in FIG. 11 is measured in advance and an acceleration and a load at a point P on the bogie 3 are measured.

Here, it is assumed that the value of the frequency of the acceleration measured by the acceleration sensor 4P at the point P is equal to or greater than a natural frequency $f_{ch} \times \sqrt{2}$ which is determined from a spring constant of an air suspension and a vehicle body mass. At this time, vibration measured by the acceleration sensor 4P is attenuated by the air suspension and thus is less likely to be transmitted to the vehicle body 2. However, vibration observed on the bogie 3 is transmitted to at least the vehicle body 2, and the acceleration observed on the bogie 3 and the acceleration observed on the vehicle body 2 are correlated. Accordingly, by preliminarily learning by what value an acceleration g1' acquired by the acceleration sensor 4G is multiplied to obtain an acceleration p1 measured by the acceleration sensor 4P, it is possible to estimate a load using only the acceleration sensor 4G on the vehicle body 2.

In preliminary learning, for example, a relationship between the acceleration g1' acquired by the acceleration sensor 4G and the acceleration p1 measured by the acceleration sensor 4P when the value of the frequency of the acceleration measured by the acceleration sensor 4P is equal to or greater than $f_{ch} \times \sqrt{2}$ is obtained. Specifically, a correction coefficient α (=p1÷g1') is acquired. As illustrated in FIG. 13, for frequencies (fG1, fG2, and the like) equal to or greater than $f_{ch} \times \sqrt{2}$, the correction coefficients α1, α2, and the like are preliminarily acquired and are stored as the correction information 634.

When the value of the frequency of the acceleration measured by the acceleration sensor 4P is less than $f_{ch} \times \sqrt{2}$, vibration observed on the bogie 3 is transmitted almost without being attenuated by an air suspension and thus it is not necessary to acquire the correction coefficient in advance.

In constructing the load information 631", similarly to construction of the load information 631 in the first embodiment, frequency bands fG1 to fG3 in which correlation is observed, accelerations g1 to g5 measured by the acceleration sensors 4G, and loads FG1 to FG5 respectively corresponding to the accelerations g1 to g5 are stored in the load information 631 in advance.

The load information 631" may be constructed for each bogie in which a load is intended to be evaluated.

When a load applied to the bogie 3A is measured by a load sensor on the bogie 3A, it is considered that the same load is measured at an arbitrary position on the bogie 3A. Accordingly, the position of the load sensor at the time of constructing the load information 631 may be an arbitrary position on the bogie 3A.

The load information 631" may be constructed for each bogie in advance.

The relationship between a load and an acceleration at a measurement point and the relationship between a frequency and a correction coefficient may be constructed by multiple regression analysis.

The load information 631" does not include information on a column of the acceleration evaluation point unlike the load information 631 according to the first embodiment. This is because the acceleration sensor in the load estimation apparatus 10 according to the third embodiment estimates a load at only the acceleration evaluation point P4G to which the acceleration sensor 4G is attached.

When acceleration sensors are attached to a plurality of acceleration evaluation points on the vehicle body 2 and a load is estimated, the load information 631" and the correction information 634 corresponding to each acceleration evaluation point may be constructed in advance.

(Process Flow in Load Estimation Apparatus 10)

Figure 14:
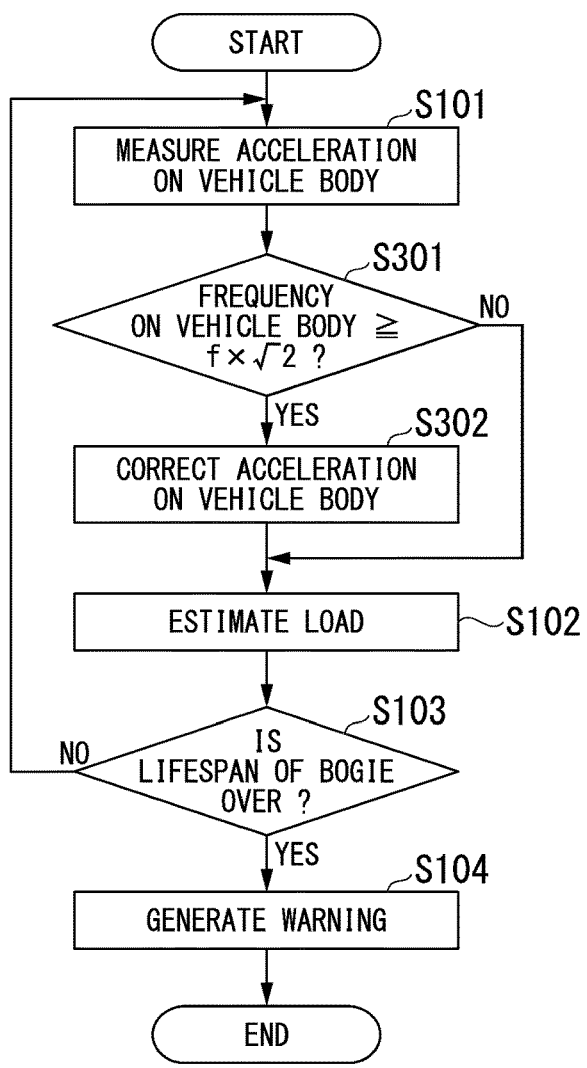
FIG. 14 is a diagram illustrating a flow of a process performed by the load estimation apparatus according to the third embodiment.

FIG. 14 is a diagram illustrating a flow of a process performed by the load estimation apparatus 10 according to the third embodiment.

The flow of a process in the load estimation apparatus 10 according to the third embodiment illustrated in FIG. 14 is different from the flow of a process in the load estimation apparatus 10 according to the first embodiment illustrated in FIG. 7 in that Steps S301 and S302 are added. The processes other than Steps S301 and S302 in the load estimation apparatus 10 according to the third embodiment are the same as the processes in the load estimation apparatus 10 according to the first embodiment and thus differences therebetween will be described below.

As illustrated in FIG. 14, first, the process of Step S101 is performed similarly to the first embodiment. In the third embodiment, the acceleration sensor 4G on the vehicle body 2 measures an acceleration g1' at a position to which the acceleration sensor 4G is attached on the bogie 3A (Step S101).

Subsequently, the acceleration sensor 4G transmits the measured acceleration g1' to the control unit 611. The control unit 611 acquires the acceleration g1' measured by the acceleration sensor 4G. The control unit 611 measures a frequency which is determined depending on a change of the acquired acceleration g1' with time.

Subsequently, the process of S301 is performed. That is, the control unit 611 determines whether the value of the measured frequency is equal to or greater than a natural frequency $f_{ch} \times \sqrt{2}$ which is determined from a spring constant of an air suspension and a vehicle body mass (Step S301).

When the value of the measured frequency is equal to or greater than $f_{ch} \times 2$ (is fG1 or fG2) (Step S301: YES), the control unit 611 determines in what frequency band the measured frequency is with reference to the correction information 634. Here, when the measured frequency is in a frequency band fG1, the control unit 611 acquires a correction coefficient α1 corresponding to the frequency band fG1 with reference to the correction information 634.

Then, the control unit 611 acquires the corrected acceleration g1 by multiplying the acceleration g1' by the acquired correction coefficient α1 (Step S302). The control unit 611 acquires a load FG1 corresponding to the acceleration g1 with reference to the load information 631". At this time, the control unit 611 estimates the load F applied to the bogie 3A to be FG1 (Step S102).

When the value of the measured frequency is less than $f_{ch} \times \sqrt{2}$ (is fG3) (Step S301: NO), the control unit 611 does not correct the acquired acceleration g1' and sets the acceleration to g5=g1'. At this time, the control unit 611 does not refer to the correction information 634. Then, the control unit 611 acquires a load FG5 corresponding to the acceleration g5 with reference to the load information 631". At this time, the control unit 611 estimates the load F applied to the bogie 3A to be FG5 (Step S102).

Subsequent to Step S102, the processes of Steps S103 to S104 are performed similarly to the first embodiment, and the flow of a process illustrated in FIG. 14 ends.

As described above, the flow of a process changes depending on the magnitude of the natural frequency $f_{ch}$. Here, the magnitude of the natural frequency fen may be adjusted at the time of constructing the load information 631" and the correction information 634.

Further, the control unit 611 may compare the calculated load F and a preset design load and determine whether the lifespan of the bogie 3 is over only when the calculated load F is equal to or greater than a preset design load. It is necessary to ascertain in advance that there is no affection to the lifespan when the calculated load is less than the design load.

Estimation of a load applied on the bogie 3A has been described above, but a load applied to the bogie 3B may be estimated in the same way.

(Operates and Advantages)

In the load estimation apparatus 10 according to the third embodiment, the acceleration sensor G according to the first embodiment is attached to only the vehicle body, and when the frequency acquired on the basis of a change with time of the acceleration acquired from the first acceleration is equal to or greater than $f \times \sqrt{2}$ where the frequency f is determined from a spring constant of an air suspension 7 disposed between the body of the bogie 3A and the vehicle body 2 and a mass of the vehicle body 2, the control unit 611 corrects the first acceleration and estimates the load applied to the body of the bogie 3A on the basis of only the corrected first acceleration.

Accordingly, even when it is difficult to attach an acceleration sensor to a bogie, the acceleration sensor can be attached to a vehicle body and thus it is possible to easily estimate a load.

Modified Example of Third Embodiment

While the load estimation apparatus 10 according to the third embodiment has been described above in detail, the specific configuration of the load estimation apparatus 10 is not limited to the above description and can be subjected to various modifications in design or the like without departing from the gist of the invention.

While some embodiments of the invention have been described above, these embodiments are presented as an example and are not intended to limit the scope of the invention. These embodiments can be modified in various other forms and can be subjected to various omissions, substitutions, and changes without departing from the gist of the invention. The embodiments and the modifications thereof belong to the scope or gist of the invention and also similarly belong to the configurations described in the appended claims and a scope equivalent thereto.

The processes which are performed by the CPU 61 are stored in the form of a program in a computer-readable recording medium, and the processes are realized by causing the CPU 61 to read and execute the program. Examples of the computer-readable recording medium include a magnetic disk, a magneto-optical disc, a CD-ROM, a DVD-ROM, and a semiconductor memory. The computer program may be transmitted to a computer via a communication line and the computer (the CPU 61) having received the program may execute the program.

The program may be provided for realizing some of the above-mentioned functions. The program may be a program which can be realized in combination with a program which is recorded in a computer system in advance, that is, a so-called differential file (a differential program).

The computer (the CPU 61) may be constituted by a single computer or may be constituted by a plurality of computers which are communicatively connected to each other.

The elements of the aforementioned embodiments can be appropriately replaced with known elements without departing from the gist of the invention. The technical scope of the invention is not limited to the aforementioned embodiments and can be modified in various forms without departing from the gist of the invention.

INDUSTRIAL APPLICABILITY

According to the aspects of the invention, it is possible to estimate a load which is applied to a bogie using an acceleration sensor, to measure a lifespan of the bogie in a simple way, and to easily evaluate soundness of a vehicle.

REFERENCE SIGNS LIST

1 Vehicle
2 Vehicle body
3A, 3B Bogie
4A, . . . , 4G Acceleration sensor
5 Wheel
6 Control device
7 Air suspension
8 Load detecting device
81 Acceleration sensor
82 Load sensor
10 Load estimation apparatus
61 CPU
611 control unit
62 Warning device
63 Storage unit
631 Load information
631' Load information
631" Load information
632 Stress information
633 Damage information
634 Correction information

The invention claimed is:

1. A load estimation apparatus comprising:
an acceleration sensor attached to at least one of a first position on a bogie body supporting wheels or a second position on a vehicle body attached to the bogie body and configured to measure a first acceleration; and
a control unit configured to estimate a load which is applied to the bogie body on the basis of load information and the first acceleration,
wherein the load information stores an acceleration which is measured at least one of the first position or the second position in mechanism analysis in advance and in which a frequency of the acceleration is within a frequency band, a load with respect to the acceleration which is measured at the same time as the acceleration by a load sensor that is attached to the bogie body during the mechanism analysis, and the frequency band of the acceleration that is a band in which there is a correlation between an observation frequency of a frequency of an estimated load estimated from the acceleration measured in the mechanism analysis and an observation frequency of a frequency of the load measured in the mechanism analysis, associated with the first position or the second position at which the acceleration is measured in the mechanism analysis,
wherein the control unit is configured to estimate the load applied to the bogie by acquiring a load with respect to an acceleration corresponding to the first acceleration from the load information when a frequency of the first acceleration is within the frequency band associated with the first position or the second position at which the first acceleration is measured, wherein, when the position of the acceleration sensor indicates the first position that is a position on the bogie body, the frequency is less than a natural frequency $f_{ch} \times \sqrt{2}$ where $f_{ch}$ is a value which is determined on the basis of a spring constant of an air suspension connecting the vehicle body and the bogie body and a vehicle body mass, and wherein, when the position of the acceleration sensor indicates the second position that is a position on the vehicle body, the frequency is equal to or greater than $f_{ch} \times \sqrt{2}$.

2. The load estimation apparatus according to claim 1, wherein a plurality of vehicle body masses are further correlated in the load information, and wherein the control unit is configured to further acquire the vehicle body mass and is configured to estimate the load which is applied to the bogie body on the basis of the load information and the first acceleration, and further on the basis of the vehicle body mass.

3. The load estimation apparatus according to claim 1, wherein a plurality of the acceleration sensors are attached to at least one of the bogie body and the vehicle body, and wherein the control unit is configured to estimate the load which is applied to the bogie body on the basis of a plurality of accelerations which are measured by the plurality of the acceleration sensors and the load information.

4. The load estimation apparatus according to claim 1, further comprising a warning device, wherein the control unit is configured to determine whether a lifespan of the bogie body is over on the basis of a sum of a preset limit load and the load which is applied to the bogie body, and wherein the control unit is configured to transmit a signal for causing the warning device to generate a warning when it is determined that the lifespan of the bogie body is over.

5. The load estimation apparatus according to claim 1, wherein the control unit is configured to estimate the load on the basis of at least an acceleration sensor that is able to measure a lateral acceleration with respect to a longitudinal direction of the vehicle body when a load which is applied from a guide rail to the bogie body is estimated, and wherein the control unit is configured to estimate the load on the basis of at least an acceleration sensor that is able to measure a vertical acceleration with respect to the longitudinal direction of the vehicle body when a load which is applied from a road to the bogie body is estimated.

6. The load estimation apparatus according to claim 1, further comprising a load detecting device that is further attached to at least one of the bogie body and the vehicle body, wherein the load detecting device includes a load sensor that is configured to measure a second load which is applied to the bogie body and an acceleration sensor that is configured to measure a second acceleration, and wherein the control unit adds the second load and the second acceleration to the load information.

7. A load estimation apparatus comprising:

an acceleration sensor attached to at least one of a first position on a bogie body supporting wheels or a second position on a vehicle body attached to the bogie body and configured to measure a first acceleration; and a control unit configured to estimate a load which is applied to the bogie body on the basis of load information and the first acceleration, wherein the load information stores an acceleration which is measured at least one of the first position or the second position in mechanism analysis in advance and in which a frequency of the acceleration is within a frequency band, a load with respect to the acceleration which is measured at the same time as the acceleration by a load sensor that is attached to the bogie body during the mechanism analysis, and the frequency band of the acceleration that is a band in which there is a correlation between an observation frequency of a frequency of an estimated load estimated from the acceleration measured in the mechanism analysis and an observation frequency of a frequency of the load measured in the mechanism analysis, associated with the first position or the second position at which the acceleration is measured in the mechanism analysis, wherein the acceleration sensor is attached to only the second position on the vehicle body, wherein the control unit is configured to correct the first acceleration when a frequency of the first acceleration which is acquired on the basis of a change with time of an acceleration acquired from the first acceleration is equal to or greater than $f_{ch} \times \sqrt{2}$ where a frequency $f_{ch}$ is a value which is determined on the basis of a spring constant of an air suspension connected between the bogie body and the vehicle body and a mass of the vehicle body, and wherein the control unit is configured to estimate the load which is applied to the bogie body on the basis of the corrected first acceleration.

8. A load estimation method comprising:

a step of measuring a first acceleration using an acceleration sensor attached to at least one of a first position on a bogie body supporting wheels or a second position on a vehicle body attached to the bogie body; and a step of estimating a load which is applied to the bogie body on the basis of load information and the first acceleration, wherein the load information stores an acceleration which is measured at at least one of the first position or the second position in mechanism analysis in advance and in which a frequency of the acceleration is within a frequency band, a load with respect to the acceleration which is measured at the same time as the acceleration by a load sensor that is attached to the bogie body during the mechanism analysis, and the frequency band of the acceleration that is a band in which there is a correlation between an observation frequency of a frequency of an estimated load estimated from the acceleration measured in the mechanism analysis and an observation frequency of a frequency of the load measured in the mechanism analysis, associated with the first position or the second position at which the acceleration is measured in the mechanism analysis, wherein, in the step of estimating the load, estimating the load applied to the bogie by acquiring a load with respect to an acceleration corresponding to the first acceleration from the load information when a frequency of the first acceleration is within the frequency band associated with the first position or the second position at which the first acceleration is measured, wherein, when the position of the acceleration sensor indicates the first position that is a position on the bogie body, the frequency is less than a natural frequency $f_{ch} \times \sqrt{2}$ where $f_{ch}$ is a value which is determined on the basis of a spring constant of an air suspension connecting the vehicle body and the bogie body and a vehicle body mass, and wherein, when the position of the acceleration sensor indicates the second position that is a position on the vehicle body, the frequency is equal to or greater than $f_{ch} \times \sqrt{2}$.

9. A non-transitory computer readable medium that stores a program causing a computer of a load estimation apparatus to perform:

a step of measuring a first acceleration using an acceleration sensor attached to at least one of a first position on a bogie body supporting wheels or a second position on a vehicle body attached to the bogie body; and a step of estimating a load which is applied to the bogie body on the basis of load information and the first acceleration, wherein the load information stores an acceleration which is measured at at least one of the first position or the second position in mechanism analysis in advance and in which a frequency of the acceleration is within a frequency band, a load with respect to the acceleration which is measured at the same time as the acceleration by a load sensor that is attached to the bogie body during the mechanism analysis, and the frequency band of the acceleration that is a band in which there is a correlation between an observation frequency of a frequency of an estimated load estimated from the acceleration measured in the mechanism analysis and an observation frequency of a frequency of the load measured in the mechanism analysis, associated with the first position or the second position at which the acceleration is measured in the mechanism analysis, wherein, in the step of estimating the load, estimating the load applied to the bogie by acquiring a load with respect to an acceleration corresponding to the first acceleration from the load information when a frequency of the first acceleration is within the frequency band associated with the first position or the second position at which the first acceleration is measured, wherein, when the position of the acceleration sensor indicates the first position that is a position on the bogie body, the frequency is less than a natural frequency $f_{ch} \times \sqrt{2}$ where $f_{ch}$ is a value which is determined on the basis of a spring constant of an air suspension connecting the vehicle body and the bogie body and a vehicle body mass, and wherein, when the position of the acceleration sensor indicates the second position that is a position on the vehicle body, the frequency is equal to or greater than $f_{ch} \times \sqrt{2}$.

* * * * *